US008654690B2

(12) United States Patent
Song

(10) Patent No.: US 8,654,690 B2
(45) Date of Patent: Feb. 18, 2014

(54) SWITCHING CARRIERS TO JOIN A MULTICAST SESSION WITHIN A WIRELESS COMMUNICATIONS NETWORK

(75) Inventor: Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 467 days.

(21) Appl. No.: 12/412,105

(22) Filed: Mar. 26, 2009

(65) Prior Publication Data

US 2009/0252076 A1 Oct. 8, 2009

Related U.S. Application Data

(60) Provisional application No. 61/041,680, filed on Apr. 2, 2008.

(51) Int. Cl.
*H04B 7/00* (2006.01)
(52) U.S. Cl.
USPC .......................................................... 370/310
(58) Field of Classification Search
USPC .................................................. 370/310–340
See application file for complete search history.

(56) References Cited

U.S. PATENT DOCUMENTS

| | | | |
|---|---|---|---|
| 7,336,659 B2 * | 2/2008 | Meago | 370/390 |
| 7,636,337 B2 | 12/2009 | Parantainen et al. | |
| 2005/0147127 A1 * | 7/2005 | Putcha et al. | 370/480 |
| 2006/0109830 A1 * | 5/2006 | Wang et al. | 370/341 |
| 2009/0295671 A1 | 12/2009 | Yoshida et al. | |
| 2010/0061285 A1 | 3/2010 | Maeda et al. | |

FOREIGN PATENT DOCUMENTS

| | | |
|---|---|---|
| CN | 1773927 A | 5/2006 |
| EP | 1622316 | 2/2006 |
| EP | 2051408 | 4/2009 |
| JP | 2000208120 A | 7/2000 |
| JP | 2000217157 A | 8/2000 |
| JP | 2005535260 | 11/2005 |
| JP | 2006042354 A | 2/2006 |
| JP | 2006262179 A | 9/2006 |
| JP | 2007521777 A | 8/2007 |

(Continued)

OTHER PUBLICATIONS

"3GPP2 C. S0054-A, Version 1.0, cdma2000 High Rate Broadcast-Multicast Packet Data Air Interface Specification" 3rd Generation Partnership Project 2 3GPP2, vol. 3GPP2.S0054-A, No. 1.0, Feb. 14, 2006, pp. 1-169, XP002520330.

(Continued)

Primary Examiner — Fang Ng
(74) Attorney, Agent, or Firm — Raphael Freiwirth

(57) ABSTRACT

Embodiments are directed to supporting a multicast session in a wireless communications network are provided. A request to register for an announced multicast session (e.g., a push to talk (PTT) session) is sent from an access terminal to an access network. The access terminal has a traffic channel on a first carrier. The access network determines whether the announced multicast session is being carried on the first carrier. The access network transmits a traffic channel assignment message allocating the access terminal a traffic channel on a second carrier if the determining step determines that the given multicast session is not being carried on the first carrier and is being carried on the second carrier. Thus, the access terminal need not send a connection request to be allocated a traffic channel on the second carrier, thereby reducing a channel outage during the carrier switch.

68 Claims, 6 Drawing Sheets

(56) References Cited

FOREIGN PATENT DOCUMENTS

| | | |
|---|---|---|
| RU | 2307480 C2 | 9/2007 |
| RU | 2307481 C2 | 9/2007 |
| WO | WO0018067 | 3/2000 |
| WO | 2004016016 | 2/2004 |
| WO | 2006126320 A1 | 11/2006 |
| WO | 2008018130 | 2/2008 |

OTHER PUBLICATIONS

International Searching Authority, PCT/US2009/038506, International Searching Authority, European Patent Office, Aug. 14, 2009.

Written Opinion, PCT/US2009/038506, International Searching Authority, European Patent Office, Aug. 14, 2009.

* cited by examiner

SWITCHING CARRIERS TO JOIN A MULTICAST SESSION WITHIN A WIRELESS COMMUNICATIONS NETWORK

CLAIM OF PRIORITY UNDER 35 U.S.C. §119

The present Application for Patent claims priority to Provisional Application No. 61/041,680, entitled "Methods of switching carriers to join a multicast session within a wireless communications network", filed Apr. 2, 2008, which is assigned to the assignee hereof and hereby expressly incorporated by reference herein in its entirety.

BACKGROUND OF THE INVENTION

1. Field of the Invention

The invention relates to communications in a wireless telecommunication system and, more particularly to switching carriers to join a multicast session within a wireless communications network.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

An embodiment of the present invention is directed to supporting a multicast session in a wireless communications network. An access terminal sends a request to register for a given multicast session. An access network receives the registration request from the access terminal, where the access terminal has already been allocated a traffic channel on a first carrier. The access network determines whether the given multicast session is being carried on the first carrier and transmits a traffic channel assignment (TCA) message allocating the access terminal a traffic channel on a second carrier if the access network determines that the given multicast session is not being carried on the first carrier and is being carried on the second carrier. The access terminal receives the TCA message allocating the access terminal the traffic channel on the second carrier.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
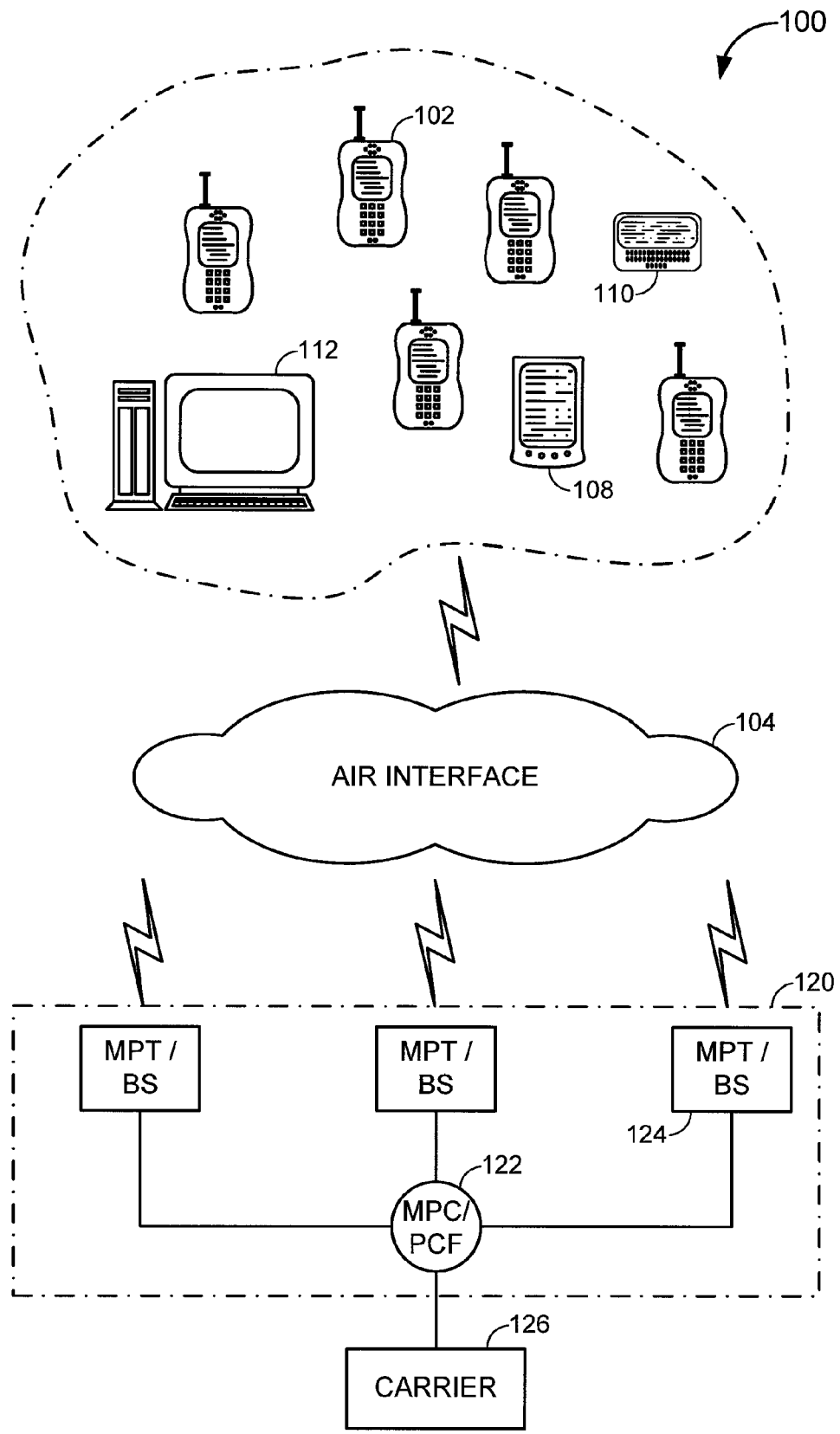
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless communication system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or subcombination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 160 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
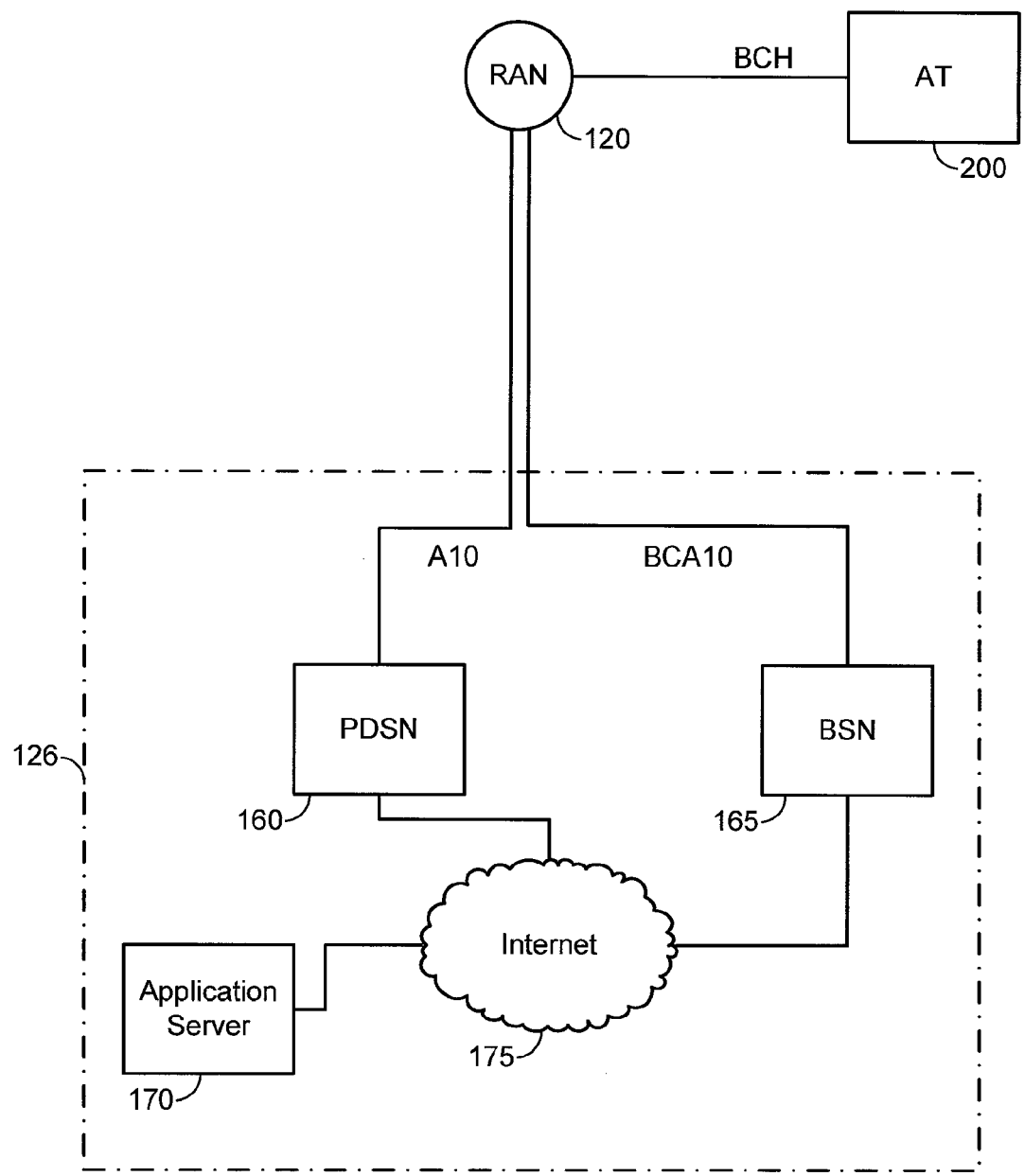
FIG. 2 illustrates the carrier network according to an embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over the air interface 104 to one or more access terminals 200.

Figure 3:
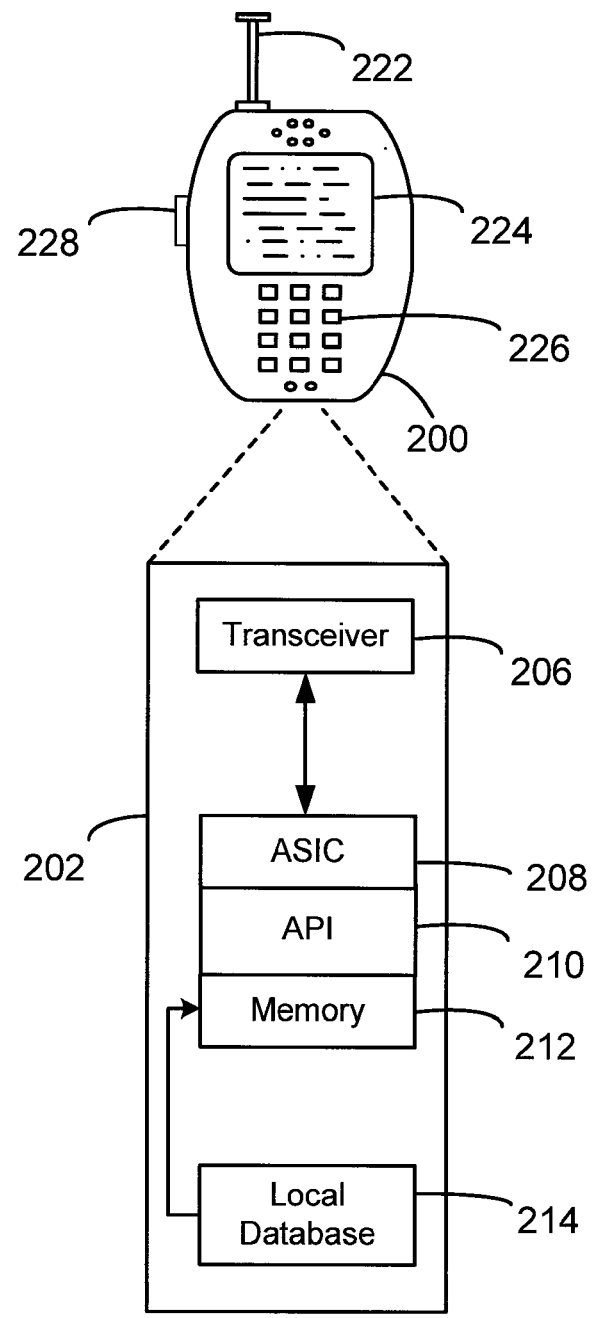
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

In conventional wireless communication systems, such as code division multiple access (CDMA) wireless communication systems, the total amount of available bandwidth is divided into different carriers. For example, each carrier can be allocated the same amount of bandwidth (although this is not necessarily the case). Generally, the RAN 120 seeks to distribute load substantially evenly across each of the carriers to avoid an overload condition on any particular carrier.

As discussed in the Background section, multicasts or multicast sessions permit transmission of the same message or set of messages to a relatively large number of access terminals, or multicast group members. Accordingly, it will be appreciated that carrying multicast messages for a particular multicast session on more than one of the available carriers in a particular sector is redundant, and wastes precious bandwidth within the wireless communication system. As such, it is well-known to transmit the multicast messages for a particular multicast session on a single carrier within each sector, and to have access terminals desiring to participate in the multicast session switch to that carrier. For access terminals that are in an "idle" state, or do not have an active traffic channel, this process is relatively efficient as "idle" access terminals are not yet connected to any particular carrier with a traffic channel. However, conventional carrier switching can be problematic to access terminals that have a current, active traffic channel on a carrier other than the carrier on which the multicast session is present, as will be discussed below in greater detail with respect to FIG. 4.

Figure 4:
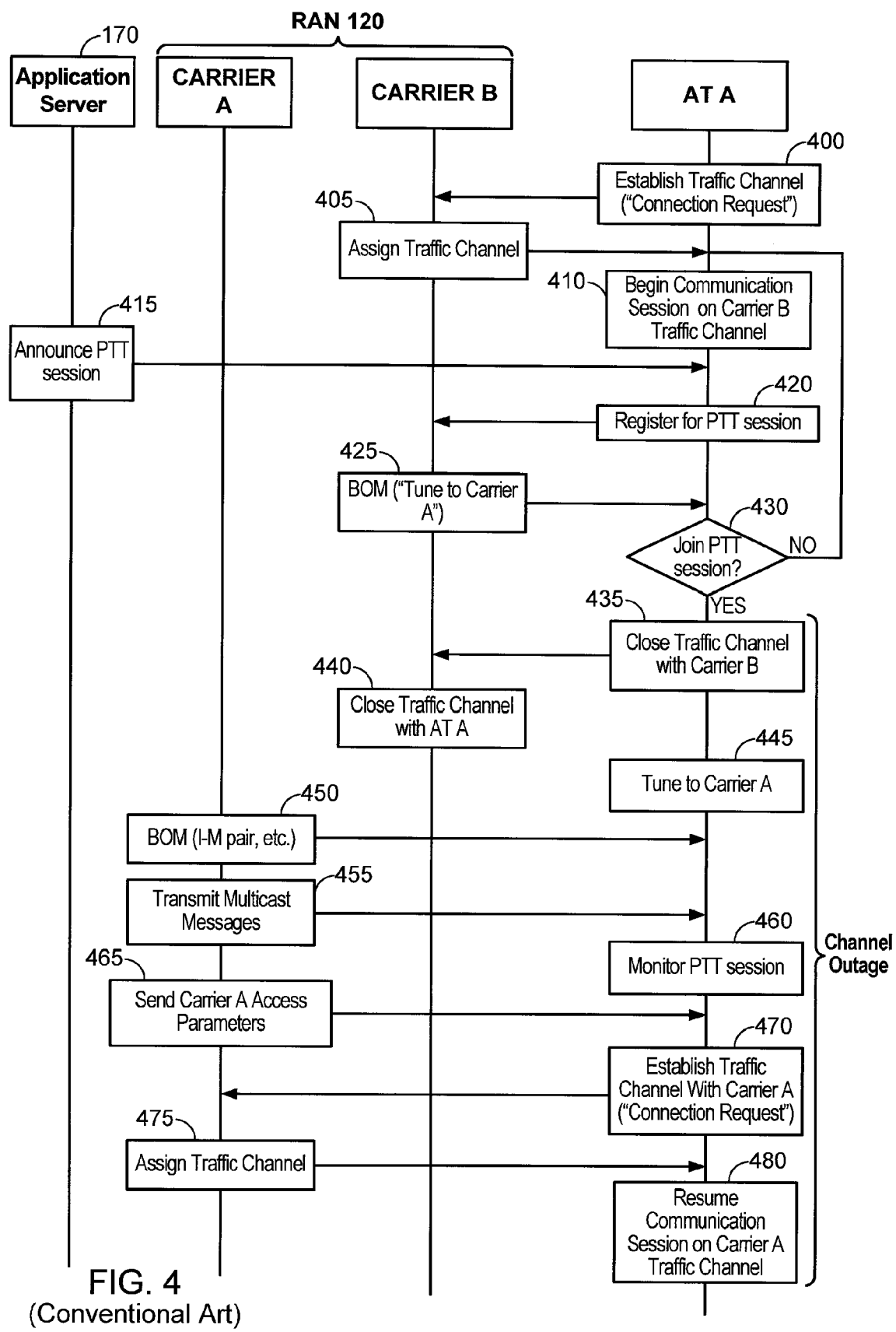
FIG. 4 illustrates a conventional multicast messaging process.

FIG. 4 illustrates a conventional multicast messaging process. In particular, FIG. 4 illustrates a conventional manner that a given access terminal with an active traffic channel on a first carrier joins an announced push-to-talk (PTT) session on a second carrier carried on a second carrier. While FIG. 4 is described below with reference to a PTT session, it will be appreciated that a similar call flow could be configured for other types of group sessions, such as a push-to-transfer (PTX) or Yugatta session. In the description of FIG. 4, reference is made to carriers A and B. However, it will be appreciated that wireless communication systems may include any number of carriers, and the description of FIG. 4 references two carriers (i.e., A and B) for convenience of explanation.

In 400, a given AT ("AT A") sends a connection request to the RAN 120 to request a traffic channel on which to communicate. For example, the connection request of 400 may be associated with the initiation of a phone call, an e-mail message transmission or download, a video download, etc. In 405, the RAN 120 receives the connection request and assigns AT A a traffic channel on a given carrier ("CARRIER B") by sending AT A a traffic channel assignment (TCA) message, as is well-known in the art. After receiving the TCA message in 405, AT A begins a communication session (e.g., voice messaging, video messaging, text messaging, etc.) with the RAN 120 on CARRIER B in 410.

In 415, the application server 170, or push-to-talk (PTT) server, sends an announce message announcing a PTT session to the RAN 120, which transmits the announce message in a plurality of sectors of the wireless communication system 100 and on each carrier that contains a target AT within each sector. Thus, the announce message is transmitted on CARRIER B and is thereby received by AT A.

In 420, assume that AT A is interested in participating in the PTT session (e.g., AT A wants to speak to the multicast group for the announced PTT session, AT A wants to listen/watch the announced PTT session, etc.). Thus, in 420, AT A attempts to register to the announced PTT session by sending a registration message, such as a BCMCSFlowRegistration message as defined by 1x EV-DO standards, to the RAN 120. The RAN 120 receives the BCMCSFlowRegistration message from AT A and sends a broadcast overhead message (BOM) on a downlink control channel in one or more slots of the downlink control channel cycle to advertise the announced PTT session. BOMs are well-known in the art and defined by 1x EV-DO standards. BOMs include a listing of one or more broadcast and multicast service (BCMCS) flow identifiers (IDs), with instructions regarding how an access terminal can "tune" to the advertised BCMCS flow. The instructions regarding how the access terminal can tune to the advertised BCMCS flow can include an interlace-multiplex (IM) pair for a downlink broadcast channel (BCH) on that carrier, or can include a designation of another carrier upon which the multicast session is carried, as well as a transmission format for the multicast session.

In 425, assume that the BOM advertising the BCMCSFlowID for the announced PTT session indicates that the announced PTT session is being carried on CARRIER A. Thus, as AT A already has an active traffic channel on CARRIER B, AT A needs to "switch" from CARRIER B to CARRIER A (i.e., tune to CARRIER A and stop tuning to CARRIER B) in order to participate in the announced PTT session. For example, if AT A attempted to maintain the traffic channel on CARRIER B while also participating in the PTT session on CARRIER A, performance on both communication sessions could suffer greatly (e.g., dropped data packets, etc.).

In 430, AT A determines whether to join the PTT session based on the knowledge that joining the PTT session requires a carrier switch. In an example, if the communication session on the previously established traffic channel of CARRIER B has a high priority (e.g., a phone call, a video-conference, etc.), AT A determines not to participate in the PTT session in order to preserve the existing communication session without suffering a channel outage during a carrier switch, and as such the process returns to 410. Otherwise, if the existing communication session has a relatively low priority such that a brief channel outage (e.g., a few seconds) is acceptable, AT A determines to perform the carrier switch and to join the announced PTT session on CARRIER A, and the process advances to 435.

In 435, AT A tears down or releases its traffic channel with CARRIER B, and signals the RAN 120 accordingly, such that the RAN 120 tears down or releases the traffic channel for AT A on CARRIER B in 440. This effectively "drops" the communication session initiated in 410. The tearing down or releasing of traffic channels is well-known in the art, and is typically performed with messaging defined in EV-DO standards, and as such will not be described in further detail for the sake of brevity.

After tearing down the traffic channel, AT A tunes to CARRIER A, 445, and receives the BOM message on CARRIER A, 450. The BOM message contains instructions on how to decode multicast messages on the BCH of CARRIER A (e.g., the interlace-multiplex (IM) pair of CARRIER A that carries the multicast flow). AT A is then able to decode multicast messages associated with the announced PTT session on CARRIER A by tuning to the designated IM pair of CARRIER A's BCH, and AT A monitors or participates in the PTT session, 460.

In 465, AT A waits for the RAN 120 to transmit the Access Parameters message. The Access Parameters message is well-known in the art, and is transmitted periodically on each carrier. Once AT A obtains the Access Parameters for CARRIER A, AT A sends a connection request to the RAN 120 to establish a connection (e.g., obtain a traffic channel on which to receive and/or transmit) with the RAN 120 on CARRIER A, 470. In 475, the RAN 120 receives the connection request and assigns AT A a traffic channel on CARRIER A by sending AT A a traffic channel assignment (TCA) message. After receiving the TCA message in 475, AT A resumes the communication session that was halted in 435 when the CARRIER B traffic channel was torn down, 480.

The time period between the tearing down of the CARRIER B traffic channel in 435 until communication resumes on the CARRIER A traffic channel in 480 can be referred to as a "channel outage". In other words, the communication flow initiated in 410 is effectively "dropped" during this period. As will be appreciated, the channel outage can cause a significant amount of delay, a number of dropped or missing packets, can degrade the session experience of AT A and/or other participants to the communication session, etc. Also, if the channel outage cannot be risked or accepted by AT A, the announced PTT session is ignored altogether, 430 (e.g., at least until the user of AT A completes the communication session initiated in 410). Thus, AT A is forced to choose between performance degradation (i.e., a channel outage) of the communication session of 410, and simply ignoring the announced PTT session.

As discussed above with respect to FIG. 4, switching carriers to tune to an announced PTT session at access terminals having a current, active traffic channel on another carrier can be problematic because an existing communication session may be dropped for a given period of time, referred to as a channel outage, before the communication session can be resumed on the new carrier. Accordingly, embodiments of the present invention are directed to reducing and/or eliminating the channel outage during carrier switches.

Figure 5:
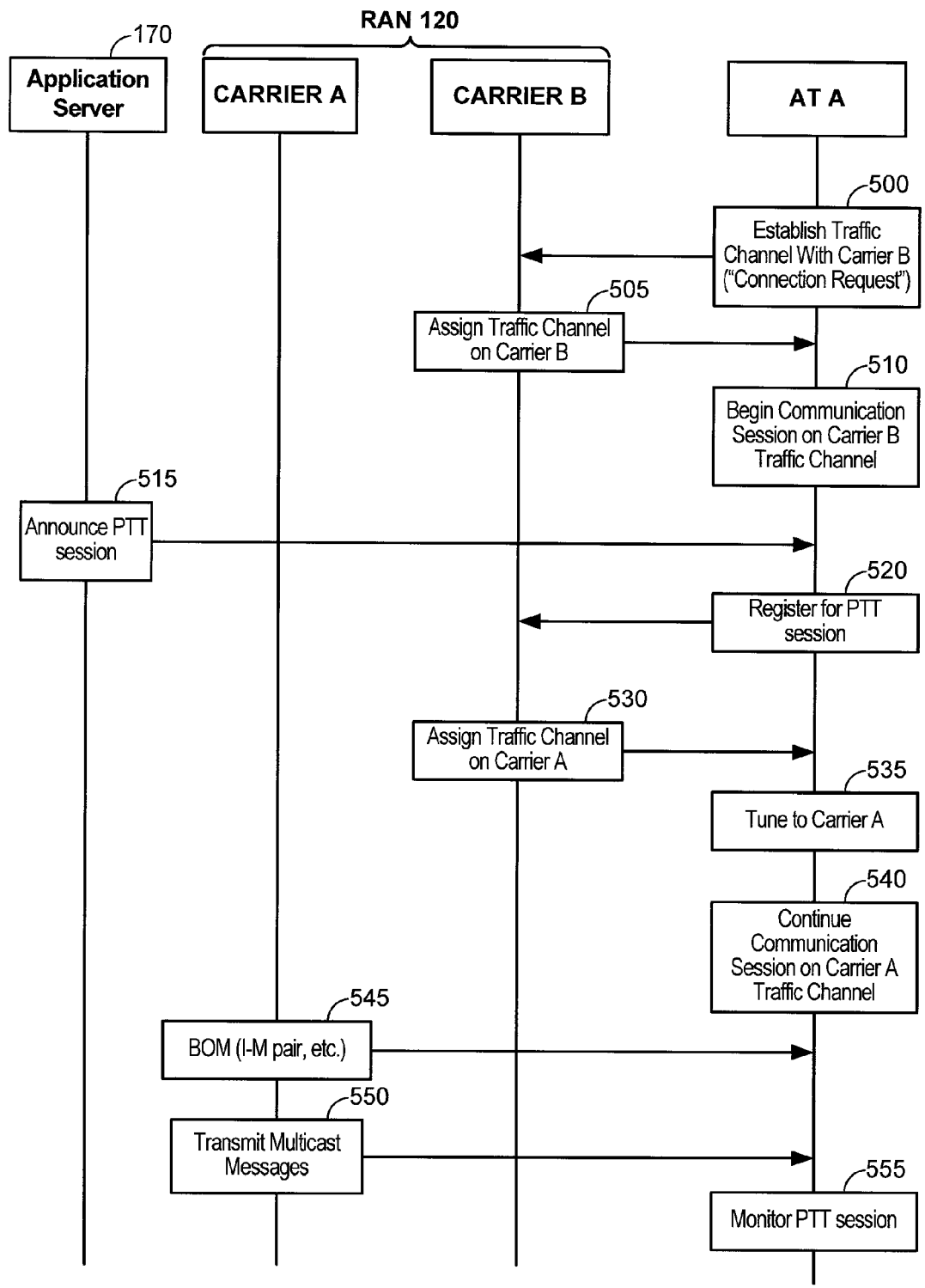
FIG. 5 illustrates a multicast messaging process according to an embodiment of the present invention.

FIG. 5 illustrates a multicast messaging process according to an embodiment of the present invention. In 500, a given AT ("AT A") sends a connection request to the RAN 120 to request a traffic channel for a communication session (e.g., which is not necessarily a multicast communication session). For example, the connection request of 500 may be associated with the initiation of a phone call, an e-mail message transmission or download, a video download, etc. In 505, the RAN 120 receives the connection request and assigns AT A a traffic channel on a given carrier ("CARRIER B") by sending AT A a traffic channel assignment (TCA) message. After receiving the TCA message in 505, AT A begins a communication session (e.g., voice messaging, video messaging, text messaging, a data transport session, a call, etc.) with the RAN 120 on CARRIER B in 510.

In 515, the application server 170, or push-to-talk (PTT) server, sends an announce message announcing a PTT session to the RAN 120, which transmits the announce message in a plurality of sectors of the wireless communication system 100 and on each carrier that contains a target AT within each sector. Thus, the announce message is transmitted on CARRIER B and is thereby received by AT A. While described herein with respect to a PTT session, it will be appreciated that other embodiments can be directed to other types of communication sessions, such as a PTX session.

In 520, assume that AT A is interested in participating in the PTT session (e.g., AT A wants to speak to the multicast group for the announced PTT session, AT A wants to listen/watch the announced PTT session, etc.). Thus, in 520, AT A attempts to register to the announced PTT session by sending a registration message, such as a BCMCSFlowRegistration message as defined by 1x EV-DO standards, to the RAN 120.

In 525, assume that the RAN has decided to serve the PTT session on CARRIER A. In 530, the RAN 120 sends a traffic channel assignment (TCA) message to AT A, on CARRIER B, that allocates a traffic channel to AT A on CARRIER A. In other words, the RAN 120 interprets the request to register to the announced PTT session, 520, as an implicit request for a channel assignment in CARRIER A because (i) AT A has a current traffic channel on a first carrier ("CARRIER B") and (ii) the announced PTT session is carried on another carrier ("CARRIER A"). Thus, the RAN 120 assumes AT A wishes to obtain a traffic channel on the new carrier (e.g., to "transfer" to from the traffic channel on CARRIER B), and preemptively allocates the traffic channel. Conventionally, no such protocols for "preemptive" channel allocation in anticipation of a carrier switch are provided.

In 535, AT A switches from CARRIER B to CARRIER A, and thereby "tunes" to AT A's newly allocated traffic channel and/or the downlink control channel on CARRIER A. While not shown explicitly within FIG. 5, the process by which AT A tunes to CARRIER A in 530 includes having AT A and the RAN 120 tear down or close the traffic channel on CARRIER B (e.g., either after or before the tuning). Thus, because a TCA message assigning a traffic channel on CARRIER A has already been received from the RAN 120, 530, AT A need not wait to request and be allocated another traffic channel on CARRIER A, but rather can simply continue the communication session (e.g., initiated in 510) in 540. Thus, the channel outage discussed above with respect to FIG. 4 is substantially reduced, with only a possible physical "tuning" delay at AT A (i.e., the switching of AT A's receiver from CARRIER B to CARRIER A) remaining present (although such delays are relatively low compared to the channel outage described with respect to FIG. 4).

In 545, the RAN 120 sends a periodic BOM on the downlink control channel of CARRIER A with instructions on how to decode multicast messaging for the announced PTT session (e.g., an IM pair) on the BCH of CARRIER A (e.g., or alternatively on the control channel itself if the control channel is being used as the BCH). The RAN 120 transmits multicast messages associated with the announced PTT session on the downlink BCH of CARRIER A in accordance with the BOM, 550, and AT A monitors or participates in the PTT session based on the instructions included in the BOM, 555.

Figure 6:
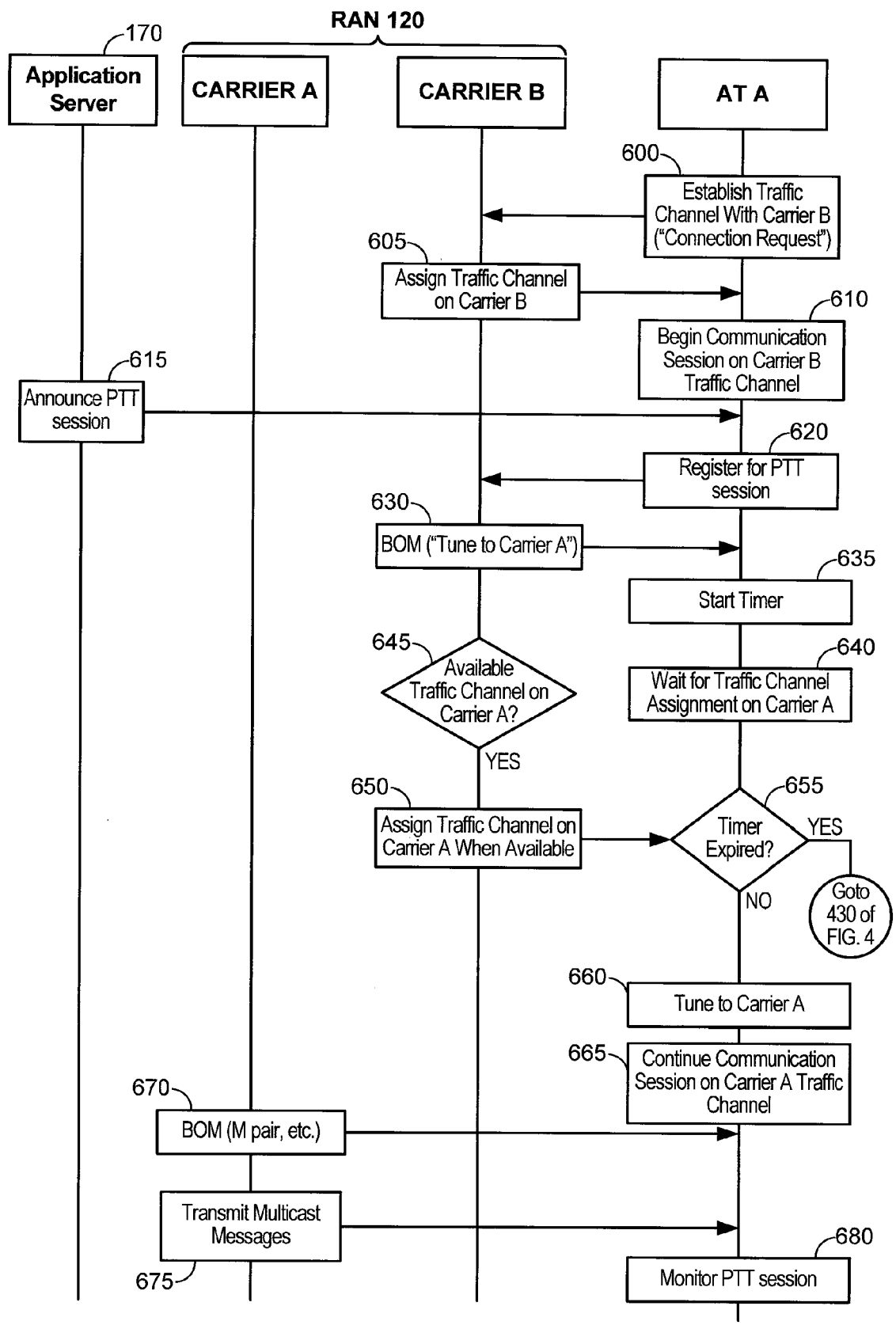
FIG. 6 illustrates a multicast messaging process according to another embodiment of the present invention.

FIG. 6 illustrates a multicast messaging process according to another embodiment of the present invention. 600 through 620 of FIG. 6 correspond to 500 through 520 of FIG. 5, respectively, and as such a further description thereof has been omitted for the sake of brevity.

In 630, the RAN 120 sends a broadcast overhead message (BOM) advertising the announced PTT session on a downlink control channel in one or more slots of the downlink control channel (e.g., as described above with respect to 425 of FIG. 4). In 630, assume that the BOM advertising the BCMCSFlowID for the announced PTT session indicates that the announced PTT session is being carried on CARRIER A. While not illustrated explicitly in FIG. 6, the RAN 120 may periodically re-send the BOM as in 630 (e.g., at a given BOM period of interval) on the downlink control channel in CARRIER B to inform ATs monitoring CARRIER B that may have missed the announce message from 615 or subsequent BOMs of the multicast session.

Next, after sending the request to register in 620, AT A starts a timer having a given time period, 635. The time period of the timer corresponds to a "wait" period, where AT A waits for a traffic channel assignment (TCA) message that allocates a traffic channel on CARRIER A to AT A at least until the timer expires without sending a connection request for the TCH assignment, 640. In an example, the timer period may be selected by a system designer and may be a given percentage or portion of the expected channel outage associated with the conventional carrier switch methodology discussed above with respect to FIG. 4. In 645, in response to the registration request from AT A in 620, the RAN 120 determines whether there is an available traffic channel on CARRIER A that is available for assignment. If there is no available traffic channel on CARRIER A, the RAN 120 does not send the TCA message allocating the CARRIER A traffic channel for AT A until such traffic channel becomes available. Thus, when a traffic channel on CARRIER A is determined to be available, the RAN 120 sends a TCA message allocating the CARRIER A traffic channel to AT A, 650.

In 655, if the TCA message allocating the CARRIER A traffic channel is not received before the expiration of the timer, the process advances to 430 of FIG. 4 and executes the conventional process, which either incurs the channel outage during the carrier switch or else ignores the announced PTT session altogether. Otherwise, in 655, if the TCA message allocating the CARRIER A traffic channel is received before the expiration of the timer, the process advances to 660. While not shown explicitly within FIG. 6, after AT A tunes to CARRIER A in 660, AT A and the RAN 120 tear down or close the traffic channel on CARRIER B. In FIG. 6, 660, 665, 670, 675, and 680 correspond to 535, 540, 545, 550 and 555 respectively, of FIG. 5, and as such will not be discussed further for the sake of brevity.

In another embodiment of the present invention, as mentioned above, it is possible that AT A misses the announce message sent in 615 of FIG. 6. In this case, AT A may send the BCMCSFlowRegistration message responsive to a subsequent BOM, as in 630, and not the announce message itself. In this situation, AT A may start the timer, as in 635 of FIG. 6, after receiving the BOM, and sends the BCMCSFlowRegistration message to the RAN 120 responsive to the BOM. Thus, this alternative embodiment of FIG. 6 is indicative of any scenario where a BOM advertising a BCMCS flow in another carrier is received before a TCA message for that carrier, and need not be limited to a situation where a registration message is first sent responsive to an announce message.

As will be appreciated from the above description, a mechanism is provided wherein a registration request, such as a BCMCSFlowRegistration message, requesting registration to an announced communication session (e.g., a PTT session, a PTX session, etc) in a first carrier, where the requesting AT has an active traffic channel in a second carrier, is used to prompt a preemptive TCA message from the RAN 120 allocating the requesting AT a traffic channel on the first carrier without the requesting AT having to explicitly request the TCA message. Accordingly, a channel outage may be reduced during the carrier switch to the announced PTT session, and the announced PTT session need not be ignored altogether so as to avoid the channel outage.

Further, while above-described embodiments of the invention generally use terminology associated with 1x EV-DO protocols, it will be appreciated that other embodiments may be directed to other telecommunication protocols, such as UMTS, GSM, CDMA, W-CDMA, LTE, WiMAX, etc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, aspects of embodiments of the invention can include logical implementations of the functions described herein. Accordingly, those skilled in the art will appreciate that embodiments of the invention are not limited to the examples provided herein.

The methods, sequences and/or algorithms described in connection with the embodiments disclosed herein may be embodied directly in hardware, in a software module executed by a processor, or in a combination of the two. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Accordingly, an embodiment of the invention can include a computer-readable medium including code stored thereon for supporting a multicast session in a wireless communications network, comprising: program code for receiving, from an access terminal, a request to register for a given multicast session, the access terminal being allocated a traffic channel on a first carrier; program code for determining whether the given multicast session is not being carried on the first carrier; and program code for transmitting a traffic channel assignment message allocating the access terminal a traffic channel on a second carrier if the determining step determines that the given multicast session is not being carried on the first carrier. Further, any of the functions describe herein can be included in as additional code in further embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of supporting a multicast session in a wireless communications network, comprising:
   receiving, from an access terminal, a request to register for a given multicast session, the access terminal being allocated a traffic channel that is supporting a communication session other than the given multicast session on a first carrier, wherein the given multicast session corresponds to a group communication session, and wherein the communication session corresponds to a media session or data session that is separate from the group communication session;
   determining whether the given multicast session is being carried on the first carrier; and
   transmitting a traffic channel assignment message allocating the access terminal a traffic channel for maintaining support of the communication session on a second carrier if the determining step determines that the given multicast session is not being carried on the first carrier and is being carried on the second carrier.

2. The method of claim 1, further comprising:
   transmitting to the access terminal, after the transmission of the traffic channel assignment message, a scheduling message on the second carrier, the scheduling message identifying the given multicast session and indicating how multicast messages associated with the given multicast session can be decoded on a downlink channel of the second carrier.

3. The method of claim 2, wherein the scheduling message is a broadcast overhead message (BOM) that identifies the given multicast session by listing a broadcast and multicast service (BCMCS) flow identifier (ID) associated with the given multicast session, and the BOM further includes an interlace-multiplex (IM) pair and a transmission format associated with the listed BCMCS flow ID.

4. The method of claim 1, further comprising:
   transmitting multicast messages associated with the given multicast session on the second carrier at least within a serving sector of the access terminal.

5. The method of claim 1, wherein the request to register to the given multicast session is received from the access terminal in response to a previously sent announce message on the first carrier that announces the given multicast session.

6. The method of claim 1, wherein the transmitting step transmits the traffic channel assignment message on the first carrier.

7. The method of claim 1, further comprising:
   determining whether the second carrier includes at least one available traffic channel.

8. The method of claim 7, wherein the transmitting step is performed only after the determining step determines that the second carrier includes at least one available traffic channel.

9. The method of claim 1, further comprising:
   transmitting to the access terminal, before the transmission of the traffic channel assignment message, a scheduling message on the first carrier, the scheduling message identifying the given multicast session and indicating that the given multicast session is being carried on the second carrier.

10. The method of claim 9, wherein the receiving step receives the request to register in response to the scheduling message.

11. The method of claim 1, wherein the transmitting step is only performed if the determining step determines that the given multicast session is not being carried on the first carrier and is being carried on the second carrier.

12. The method of claim 1, wherein the request to register to the given multicast session is a broadcast and multicast service (BCMCS) flow registration message.

13. The method of claim 1, wherein the request to register for the given multicast session is interpreted as a request to perform the transmitting step such that the access terminal need not send a connection request to be allocated the traffic channel on the second carrier.

14. The method of claim 1,
   wherein the traffic channel on the first carrier and the traffic channel on the second carrier are each dedicated, unicast traffic channels assigned to the access terminal,
   wherein the given multicast session is carried on a broadcast channel on the second carrier.

15. The method of claim 1,
   wherein the given multicast session corresponds to a push-to-talk (PTT) session.

16. The method of claim 1, wherein the traffic channel assignment message that assigns the traffic channel on the second carrier is transmitted over the first carrier before the access terminal switches from the first carrier to the second carrier for the given multicast session.

17. The method of claim 1, wherein the traffic channel on the first carrier and the traffic channel on the second carrier each correspond to a dedicated, unicast channel configured to support uplink transmissions from the access terminal that are associated with the communication session.

18. The method of claim 1,
   wherein the media session corresponds to a phone call or video call.

19. The method of claim 1, further comprising:
   supporting the given multicast session and the communication concurrently on the second carrier by (i) transmitting multicast data to the access terminal for the given multicast session over a broadcast channel on the second carrier, and (ii) exchanging data with the access terminal for the communication session over the traffic channel on the second carrier.

20. A method of supporting a multicast session in a wireless communications network, comprising:
   receiving, from an access terminal, a request to register for a given multicast session, the access terminal being allocated a traffic channel on a first carrier;
   determining whether the given multicast session is being carried on the first carrier; and
   transmitting a traffic channel assignment message allocating the access terminal a traffic channel on a second carrier if the determining step determines that the given multicast session is not being carried on the first carrier and is being carried on the second carrier, wherein the request to register to the given multicast session is received from the access terminal in response to a previously sent scheduling message on the first carrier that identifies the given multicast session and indicating that the given multicast session is being carried on the second carrier.

21. The method of claim 20, wherein the previously sent scheduling message is a broadcast overhead message (BOM) that identifies the given multicast session by listing a broadcast and multicast service (BCMCS) flow identifier (ID) associated with the given multicast session.

22. A method of switching carriers to participate in a multicast session in a wireless communications network, comprising:

sending, from an access terminal, a request to register for a given multicast session, the access terminal being allocated a traffic channel that is supporting a communication session other than the given multicast session on a first carrier, wherein the given multicast session corresponds to a group communication session, and wherein the communication session corresponds to a media session or data session that is separate from the group communication session; and receiving a traffic channel assignment (TCA) message allocating the access terminal a traffic channel for maintaining support of the communication session on a second carrier if the given multicast session is not being carried on the first carrier and is being carried on the second carrier.

23. The method of claim 22, further comprising:
tuning to the second carrier.

24. The method of claim 23, wherein, after tuning to the second carrier, the access terminal concurrently participates in both the communication session via the traffic channel on the second carrier and the given multicast session via a broadcast channel.

25. The method of claim 23, further comprising:
receiving a scheduling message on the second carrier, the scheduling message identifying the given multicast session and indicating how multicast messages associated with the given multicast session can be decoded on a downlink channel of the second carrier.

26. The method of claim 25, wherein the scheduling message is a broadcast overhead message (BOM) that identifies the given multicast session by listing a broadcast and multicast service (BCMCS) flow identifier (ID) associated with the given multicast session, and the BOM further includes an interlace-multiplex (IM) pair and a transmission format associated with the listed BCMCS flow ID.

27. The method of claim 25, further comprising:
receiving multicast messages associated with the given multicast session on the downlink channel of the second carrier; and
decoding the received multicast messages based on the received scheduling message.

28. The method of claim 23, further comprising:
transitioning the communication session at the access terminal carried over the traffic channel on the first carrier to the traffic channel on the second carrier.

29. The method of claim 22, wherein the sending step is performed in response to a previously received announce message on the first carrier that announces the given multicast session.

30. The method of claim 22, wherein the TCA message is received on the first carrier.

31. The method of claim 22, further comprising:
receiving a scheduling message on the first carrier that identifies the given multicast session and that indicates the given multicast session is being carried on the second carrier, before receiving the TCA message.

32. The method of claim 31, wherein the sending step sends the request to register in response to the received scheduling message.

33. The method of claim 22, further comprising:
starting a timer having a given timer period after the sending step.

34. The method of claim 33, further comprising:
releasing the traffic channel on the first carrier before receiving the TCA message allocating the traffic channel on the second carrier if the timer expires before receiving the TCA message.

35. The method of claim 33, wherein the TCA message allocating the traffic channel on the second carrier is received before the timer expires.

36. The method of claim 35, further comprising:
tuning to the second carrier; and
transitioning the communication session at the access terminal carried over the traffic channel on the first carrier to the traffic channel on the second carrier.

37. The method of claim 22, wherein the request to register to the given multicast session is a broadcast and multicast service (BCMCS) flow registration message.

38. The method of claim 22, wherein the request to register for the given multicast session is interpreted, at an access network, as a request to perform the first transmitting step such that the access terminal need not send a connection request to be allocated the traffic channel on the second carrier.

39. The method of claim 22,
wherein the media session corresponds to a phone call or video call.

40. A method of switching carriers to participate in a multicast session in a wireless communications network, comprising:

sending, from an access terminal, a request to register for a given multicast session, the access terminal being allocated a traffic channel on a first carrier; and receiving a traffic channel assignment (TCA) message allocating the access terminal a traffic channel on a second carrier if the given multicast session is not being carried on the first carrier and is being carried on the second carrier, wherein the sending step is performed in response to a previously received scheduling message on the first carrier that identifies the given multicast session and that indicates the given multicast session is being carried on the second carrier.

41. The method of claim 40, wherein the previously received scheduling message is a broadcast overhead message (BOM) that identifies the given multicast session by listing a broadcast and multicast service (BCMCS) flow identifier (ID) associated with the given multicast session.

42. An access network in a wireless communications network, comprising:

means for receiving, from an access terminal, a request to register for a given multicast session, wherein the given multicast session corresponds to a group communication session, the access terminal being allocated a traffic channel that is supporting a communication session other than the given multicast session on a first carrier, wherein the communication session corresponds to a media session or data session that is separate from the group communication session;
means for determining whether the given multicast session is being carried on the first carrier; and
means for transmitting a traffic channel assignment message allocating the access terminal a traffic channel for maintaining support of the communication session on a second carrier if the means for determining determines that the given multicast session is not being carried on the first carrier and is being carried on the second carrier.

43. The access network of claim 42, further comprising:
means for transmitting to the access terminal, after the transmission of the traffic channel assignment message, a scheduling message on the second carrier, the scheduling message identifying the given multicast session and indicating how multicast messages associated with the given multicast session can be decoded on a downlink channel of the second carrier.

44. The access network of claim 42, further comprising:
means for transmitting multicast messages associated with the given multicast session on the second carrier at least within a serving sector of the access terminal.

45. The access network of claim 42, further comprising:
means for transmitting to the access terminal, before the transmission of the traffic channel assignment message, a scheduling message on the first carrier, the scheduling message identifying the given multicast session and indicating that the given multicast session is being carried on the second carrier.

46. An access terminal in a wireless communications network, comprising:
means for sending a request to register for a given multicast session, the access terminal being allocated a traffic channel that is supporting a communication session other than the given multicast session on a first carrier, wherein the given multicast session corresponds to a group communication session, and wherein the communication session corresponds to a media session or data session that is separate from the group communication session; and
means for receiving a traffic channel assignment (TCA) message allocating the access terminal a traffic channel for maintaining support of the communication session on a second carrier if the given multicast session is not being carried on the first carrier and is being carried on the second carrier.

47. The access terminal of claim 46, further comprising:
means for tuning to the second carrier.

48. The access terminal of claim 47, further comprising:
means for transitioning the communication session at the access terminal carried over the traffic channel on the first carrier to the traffic channel on the second carrier.

49. The access terminal of claim 47, further comprising:
means for receiving a scheduling message on the second carrier, the scheduling message identifying the given multicast session and indicating how multicast messages associated with the given multicast session can be decoded on a downlink channel of the second carrier.

50. The access terminal of claim 47, further comprising:
means for receiving multicast messages associated with the given multicast session on a downlink channel of the second carrier; and
means for decoding the received multicast messages based on a received scheduling message.

51. An access network in a wireless communications network, comprising:
logic configured to receive, from an access terminal, a request to register for a given multicast session, the access terminal being allocated a traffic channel that is supporting a communication session other than the given multicast session on a first carrier, wherein the given multicast session corresponds to a group communication session, and wherein the communication session corresponds to a media session or data session that is separate from the group communication session;
logic configured to determine whether the given multicast session is being carried on the first carrier; and
logic configured to transmit a traffic channel assignment message allocating the access terminal a traffic channel for maintaining support of the communication session on a second carrier if the logic configured to determine determines that the given multicast session is not being carried on the first carrier and is being carried on the second carrier.

52. The access network of claim 51, further comprising:
logic configured to transmit to the access terminal, after the transmission of the traffic channel assignment message, a scheduling message on the second carrier, the scheduling message identifying the given multicast session and indicating how multicast messages associated with the given multicast session can be decoded on a downlink channel of the second carrier.

53. The access network of claim 51, further comprising:
logic configured to transmit multicast messages associated with the given multicast session on the second carrier at least within a serving sector of the access terminal.

54. The access network of claim 51, further comprising:
logic configured to transmit to the access terminal, before the transmission of the traffic channel assignment message, a scheduling message on the first carrier, the scheduling message identifying the given multicast session and indicating that the given multicast session is being carried on the second carrier.

55. An access terminal in a wireless communications network, comprising:
logic configured to send a request to register for a given multicast session, the access terminal being allocated a traffic channel that is supporting a communication session other than the given multicast session on a first carrier, wherein the given multicast session corresponds to a group communication session, and wherein the communication session corresponds to a media session or data session that is separate from the group communication session; and
logic configured to receive a traffic channel assignment (TCA) message allocating the access terminal a traffic channel for maintaining support of the communication session on a second carrier if the given multicast session is not being carried on the first carrier and is being carried on the second carrier.

56. The access terminal of claim 55, further comprising:
logic configured to tune to the second carrier.

57. The access terminal of claim 56, further comprising:
logic configured to transition the communication session at the access terminal carried over the traffic channel on the first carrier to the traffic channel on the second carrier.

58. The access terminal of claim 56, further comprising:
logic configured to receive a scheduling message on the second carrier, the scheduling message identifying the given multicast session and indicating how multicast messages associated with the given multicast session can be decoded on a downlink channel of the second carrier.

59. The access terminal of claim 56, further comprising:
  logic configured to receive multicast messages associated with the given multicast session on a downlink channel of the second carrier; and
  logic configured to decode the received multicast messages based on a received scheduling message.

60. A non-transitory computer-readable medium comprising instructions, which, when executed by an access network in a wireless communications network, cause the access network to perform operations, the instructions comprising:
  program code to receive, from an access terminal, a request to register for a given multicast session, the access terminal being allocated a traffic channel that is supporting a communication session other than the given multicast session on a first carrier, wherein the given multicast session corresponds to a group communication session, and wherein the communication session corresponds to a media session or data session that is separate from the group communication session;
  program code to determine whether the given multicast session is being carried on the first carrier; and
  program code to transmit a traffic channel assignment message allocating the access terminal the traffic channel for maintaining support of the communication session on a second carrier if the program code to determine determines that the given multicast session is not being carried on the first carrier and is being carried on the second carrier.

61. The non-transitory computer-readable medium of claim 60, further comprising:
  program code to transmit to the access terminal, after the transmission of the traffic channel assignment message, a scheduling message on the second carrier, the scheduling message identifying the given multicast session and indicating how multicast messages associated with the given multicast session can be decoded on a downlink channel of the second carrier.

62. The non-transitory computer-readable medium of claim 61, further comprising:
  program code to transmit multicast messages associated with the given multicast session on the second carrier at least within a serving sector of the access terminal.

63. The non-transitory computer-readable medium of claim 61, further comprising:
  program code to transmit to the access terminal, before the transmission of the traffic channel assignment message, a scheduling message on the first carrier, the scheduling message identifying the given multicast session and indicating that the given multicast session is being carried on the second carrier.

64. A non-transitory computer-readable medium comprising instructions, which, when executed by an access terminal in a wireless communications network, cause the access terminal to perform operations, the instructions comprising:
  program code to send a request to register for a given multicast session, the access terminal being allocated a traffic channel that is supporting a communication session other than the given multicast session on a first carrier, wherein the given multicast session corresponds to a group communication session, and wherein the communication session corresponds to a media session or data session that is separate from the group communication session; and
  program code to receive a traffic channel assignment (TCA) message allocating the access terminal a traffic channel for maintaining support of the communication session on a second carrier if the given multicast session is not being carried on the first carrier and is being carried on the second carrier.

65. The non-transitory computer-readable medium claim 64, further comprising:
  program code to tune to the second carrier.

66. The non-transitory computer-readable medium of claim 65, further comprising:
  program code to transition the communication session at the access terminal carried over the traffic channel on the first carrier to the traffic channel on the second carrier.

67. The non-transitory computer-readable medium of claim 65, further comprising:
  program code to receive a scheduling message on the second carrier, the scheduling message identifying the given multicast session and indicating how multicast messages associated with the given multicast session can be decoded on a downlink channel of the second carrier.

68. The non-transitory computer-readable medium of claim 65, further comprising:
  program code to receive multicast messages associated with the given multicast session on a downlink channel of the second carrier; and
  program code to decode the received multicast messages based on a received scheduling message.

* * * * *